United States Patent
Corry et al.

(10) Patent No.: US 9,565,844 B2
(45) Date of Patent: Feb. 14, 2017

(54) FISHING WEIGHT

(71) Applicants: Frank Corry, Ingleside, TX (US); Bart Payne, Alice, TX (US)

(72) Inventors: Frank Corry, Ingleside, TX (US); Bart Payne, Alice, TX (US)

(*) Notice: Subject to any disclaimer, the term of this patent is extended or adjusted under 35 U.S.C. 154(b) by 104 days.

(21) Appl. No.: 14/691,616

(22) Filed: Apr. 21, 2015

(65) Prior Publication Data

US 2015/0305316 A1    Oct. 29, 2015

Related U.S. Application Data

(60) Provisional application No. 61/985,696, filed on Apr. 29, 2014.

(51) Int. Cl.
| | | |
|---|---|---|
| A01K 95/00 | (2006.01) | |
| A01K 85/01 | (2006.01) | |
| A01K 91/06 | (2006.01) | |

(52) U.S. Cl.
CPC .............. *A01K 95/00* (2013.01); *A01K 85/01* (2013.01); *A01K 91/06* (2013.01)

(58) Field of Classification Search
USPC ..................... 43/44.87, 43.1, 44.9
See application file for complete search history.

(56) References Cited

U.S. PATENT DOCUMENTS

| | | | | |
|---|---|---|---|---|
| 2,186,281 | A | | 1/1940 | Cochran |
| 4,060,925 | A | * | 12/1977 | Bias .......... A01K 97/04 43/41.2 |
| 4,139,960 | A | * | 2/1979 | Chojnowski ......... A01K 93/02 43/15 |
| 4,484,405 | A | * | 11/1984 | Woods ............. A01K 93/00 43/1 |
| 5,456,041 | A | * | 10/1995 | Schoeberlein ........ A01K 93/00 43/44.91 |
| 5,713,152 | A | * | 2/1998 | Domack ............. A01K 93/00 24/543 |
| 6,389,736 | B1 | * | 5/2002 | Frost ................ A01K 93/00 43/44.87 |
| D562,934 | S | | 2/2008 | Haney |
| 7,415,792 | B1 | * | 8/2008 | Noble ............... A01K 93/00 43/42.31 |
| 9,265,240 | B2 | * | 2/2016 | Kavanaugh .......... A01K 93/00 |
| 9,433,199 | B2 | * | 9/2016 | Reed ................ A01K 93/00 |

(Continued)

FOREIGN PATENT DOCUMENTS

| | | | | |
|---|---|---|---|---|
| FR | 2550055 A1 | * | 2/1985 | ...... A01K 93/00 |
| WO | 2010131036 | | 11/2010 | |

OTHER PUBLICATIONS

Website re. lures: www.bombersaltwatergrade.com, author: Barnie White.

*Primary Examiner* — Christopher P Ellis

(57) ABSTRACT

Disclosed is a hollow plastic fishing weight comprising three separate bodies, which include a hemispherical body, a tapered cylindrical body and a concave lid. All three bodies are glued together to form a single piece of the hollow plastic fishing weight. An eye is attached on the hemispherical body and the concave lid at both ends of the fishing weight. A lead weight is placed inside the fishing weight that makes the lower part of the fishing weight heavier than the top part. A plurality of pellets are placed inside the fishing weight that produce sound to attract fish towards bait.

7 Claims, 1 Drawing Sheet

(56) References Cited

U.S. PATENT DOCUMENTS

| | | | |
|---|---|---|---|
| 2005/0097806 A1* | 5/2005 | Schumacher | A01K 93/00 43/44.9 |
| 2005/0279010 A1* | 12/2005 | Krog | A01K 97/01 43/44.87 |
| 2010/0031554 A1* | 2/2010 | Brooks, Jr. | A01K 93/00 43/44.87 |
| 2015/0257375 A1* | 9/2015 | Byrd | A01K 97/02 43/17 |

* cited by examiner

4
FISHING WEIGHT

CROSS REFERENCE TO RELATED APPLICATIONS

This non provisional patent application is based on U.S. Provisional Patent Application Ser. No. 61/985,696, entitled "Fishing Weight", filed Apr. 29, 2014, the priority of which is hereby claimed and the disclosure of which is incorporated herein by reference in its entirety.

BACKGROUND

Field of the Invention

The present invention relates to fishing weights. More particularly the invention relates to a fishing weight having three separate bodies: A top body, a central body and a bottom body, threaded glued to each other, thus, forming a single piece.

Description of the Related Art

Fishing weights, also called popping corks herein, are used to suspend bait at a predetermined depth. Fishing weights have the ability to carry lures to inaccessible areas of the sea, especially where the water current is strong. A fishing line extends from the top of a fishing weight and attaches to a fishing rod. A leader line extends from the bottom of a fishing weight which further connects the lure. The fishing weight also has pellets inside, which produce sound that attracts fish towards the bait. The up and down motion of the fishing weight indicates that a fish has been trapped in a hook.

The type and design of a fishing weight used for fishing depends on several factors, such as weather conditions, type and size of the fish sought, and the type of water body selected (e.g. river, lake, sea) for fishing. Waggler, Avon, Stick, Quill, and Bubble are examples of types of fishing weight existing in the art. Many a time, a fisherman has to go miles away from the shore into deep sea to catch specific types of fish. In deep waters, generally, winds are strong and waves are turbulent. For successful fishing in such weather conditions, a robust fishing weight is needed that will remain upright at all times. This can be achieved by using a fishing weight with a heavy bottom.

In an already existing art, there exists a fishing weight known as a popping weight or popping cork that is available in different shapes. The popping weight tends to remain at a constant location at all times while fishing. It also has a tendency to cause an unusual ripple at the surface of the water when the line connected to the popping weight is jerked, which in turn helps in attracting fish towards the bait. It has been found that this popping weight works well initially, but deteriorates after repeated jerking. Upon use, the popping weight tends to imitate a fish taking bait on the surface and an auditory "click" from the beads on the wire occurs during the jerking process. The fish are attracted by the sound and surface disturbance, then see and attack the jighead and swim bait hanging from 1 to 2 feet below. Jigheads and swimbait are a type of fishing lure which are attached to the line the cork is also on.

It is known in the art that not all popping corks are equal. Fishermen or anglers quickly learn what works best. It is known that relatively inexpensive or poorly manufactured popping corks bend out of shape due to inferior wires, central rods, or parts in general, which decrease the quality of the action and sound of the cork over time. Many have just a single ball bearing rattle on top and bottom and don't produce a good, loud "pop" or "click." The bearings themselves may be cheap plastic that produces a muted sound.

Many times the eyes of the popping cork are not firmly attached to the cork. Often the eyes are attached to the fishing weight via a central rod running through the center of the fishing weight. This serves as a disadvantage when a comparatively large fish has taken the bait. In a process of unhooking itself the fish can dislodge the eye from the fishing weight.

Often, popping corks are made of cork material and after repeated use, tend to deteriorate. Hence the plastic fishing cork became popular among anglers. However, the plastic cork or weight had other issues relative to causing entanglement of the fishing line when casting, and causing aerodynamic drag resulting in poor casting distance.

Hence, there continues to be a need for an improved popping cork or fishing weight which addresses the problems raised above. A need continues for improvements to popping corks, finding one which is robust and has significant strength, thereby preventing the cork from rupturing, and ultimately result in successful fishing.

U.S. D 562,934 S issued to Bryan S. Haney, discloses a fishing float.

U.S. Pat. No. 2,186,281 issued to R. D. Cochran discloses a popping cork.

US Patent Application Publication 2010/0031554 A1 for Gerald D. Brooks discloses a Plastic Fishing Cork.

U.S. Pat. No. 7,415,792 issued to Mark D. Noble, discloses a Float Fishing Apparatus.

WO 2010/0131036 A1 to Andrew Kitchener, discloses a Fishing Device.

Popping corks were discussed in the website: http://www.bombersaltwatergrade.com/fishingguide/fishingarticles/redfish/poppincorktips wherein the cork featured contained three plastic beads on top and a pair of brass balls underneath to create a full, natural sound when twitched or popped. It was believed that this combination of clicks created a full, realistic sound that gets both redfish and speckled trout excited. The cork also contained a zinc washer on the underside of the cork that provides for longevity and prevents chipping and wearing of the underside of the cork. The wire used on the bombersaltwater cork is a heat-treated stainless steel that flexes but doesn't crimp. It was also located on the website: www.bombersaltwatergrade.com, a popper entitled Paradise Popper X-treme® This popper has a Styrofoam body with external beads of which are part metal and part plastic, a titanium wire through the core of the popper and no eyes since attachment of the popper is to the rod directly.

A need continues to exist for a modified fishing popper cork.

SUMMARY

An object of the present invention is to provide a hollow plastic fishing weight with three separate bodies—a hemispherical body, a concave lid and a tapered cylindrical body glued to the hemispherical body and the concave lid. The tapered cylindrical body forms a first half and a second half separated by an imaginary horizontal central plane. The first half is below the imaginary horizontal plane in normal operating conditions. A first eye is attached to the concave lid and a second eye is attached to the hemispherical body.

In an embodiment of the present invention, the first half and the hemispherical body are heavier than the second half and the concave lid. A lead weight is glued and is placed inside the first half of the tapered cylindrical body. In another embodiment of the invention, a plurality of lead pellets is placed inside the fishing weight. The present weight differs from the art in that there is no central rod or wire within the cavity of the cork, and the eyes are secured to the ends of the cork with adhesive. Alternatively the eyes can be plastic and an integral part of the cork ends.

It has been found that the present weight is successful for fishing speckled trout and red fish; in Florida snook is reacting well to this cork; in shore, fish like trout, red fish, and flounder. In high winds the noise the cork makes attracts fish. High winds are defined as 25 miles per hour and above. It has been found that the inventive cork excels in above 25 mph conditions, even under turbulent fishing conditions. The subject popper is advantageous over the other market products because of the hard plastic shell used which makes it highly durable under various fishing conditions (e.g. high winds, strong corrosive environment, sun and UV rays; damage from human elements such as accidently stepping on it.) It has further been found to withstand at least 40 pounds of dead weight load from an object (e.g. fish) and over 200 pounds of weight crushing force, without breaking or shattering. An additional embodiment includes using two ⅜ inch steel shot instead of multiple lead shots inside the cork.

BRIEF DESCRIPTION OF DRAWING

The features of the present invention are set forth with particularity in the appended claims. Embodiments of the present invention will hereinafter be described in conjunction with the appended drawings provided to illustrate and not to limit the scope of the claims, wherein like designations denote like elements, and in which:

DETAILED DESCRIPTION OF EMBODIMENTS

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components which constitutes a significant change and improvement in the design of a fishing weight. Accordingly, the components and the method steps have been represented, showing only specific details that are pertinent for an understanding of the present invention so as not to obscure the disclosure with details that will be readily apparent to those with ordinary skill in the art having the benefit of the description herein.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
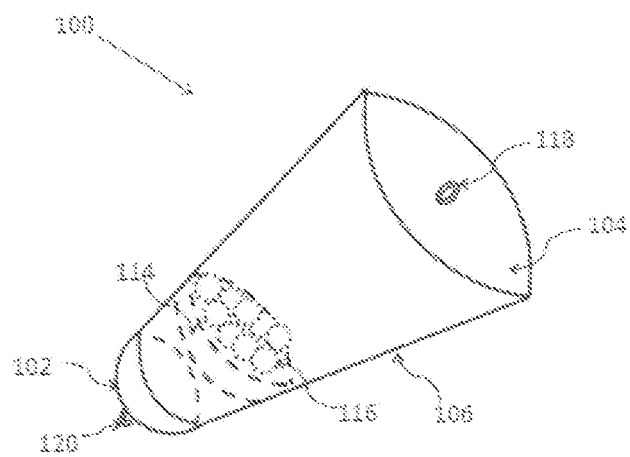
FIG. 1 shows a perspective view of a hollow plastic fishing weight with a hemispherical body, a concave lid and a tapered cylindrical body glued and threaded to each other, and the concave lid.
Figure 2:
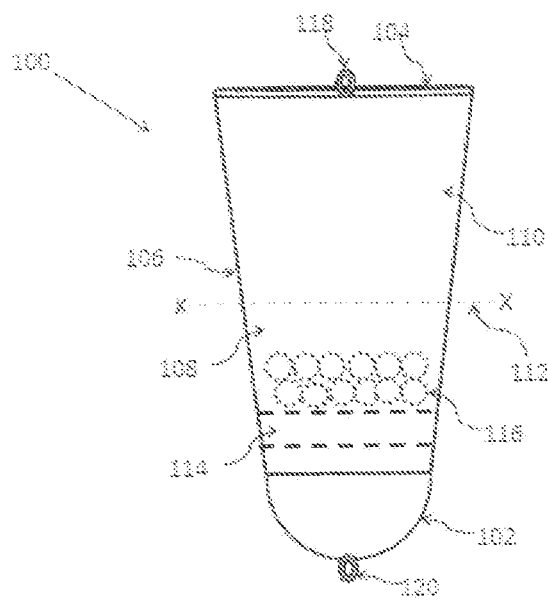
FIG. 2 shows a from view of the fishing weight of FIG. 1 with an imaginary horizontal plane, dividing the tapered cylindrical body in first and second half.

A perspective view of a hollow plastic fishing weight 100 according to an illustrative embodiment of the present invention is shown in FIG. 1. The fishing weight 100 comprises a hemispherical body 102, a concave lid 104 and a tapered cylindrical body 106. A front view of the fishing weight 100 according to an illustrative embodiment of the present invention is shown in FIG. 2. It should be appreciated that the term hollow plastic fishing weight 100 and fishing weight 100 can be interchangeably used in the current disclosure. Unlike the art, the present fishing weight has no central rod, and a 100% tie off. The weight has a lower profile in the water. The plastic body is weighted differently between top and bottom half. The present popping cork is not an integral unit like many in the art, but gas a top and bottom which are threaded and glued, or secured together.

The total mass of the exemplified cork is about one (1) ounce. This mass works well with the presently described design and size, but users can design a cork having slightly more or less mass depending on the desired use, for example, shallow verses deep waters. The mass can preferably vary from about ⅝ to about 2 ounces. The weight may also be more if design for deep water use. The aerodynamic design of the cork will provide for long and accurate casting. Popping corks are primarily used with live bait such as shrimp or pinfish.

Recently anglers are finding that corks are also good for rigging with jigs and plastic lures. The present subject cork works on calm waters as well as tumultuous windy, water-choppy conditions. A weighted cork allows for longer casts, while the rattle adds more noise to attract fish.

The fishing weight 100 forms a first half 108 and a second half 110 separated by an imaginary horizontal plane 112. The front view of the imaginary horizontal plane 112 is shown by an imaginary horizontal axis X-X in FIG. 2. The hemispherical body 102 and the concave lid 104 are glued to the first half 108 and the second half 110 of the tapered cylindrical body 106, respectively, with the help of a first type of adhesive. The concave lid 104 has threading that further helps to securely attach itself to the tapered cylindrical body 106. During normal operating conditions, the first half 108 is below the horizontal plane 112.

It has been found that the hollow cavity filled with lead weights and shots makes a noise that lures the fish to the bait. The weight load is on the bottom portion of the popping cork making it a low profile weight or popping cork. Low profile meaning that the cork will lay low in the water during use. Other popping corks generally lay on their side, or not low enough in the water to function properly. Here, when a user is jerking the fishing line, the cork will momentarily skip in the water and then go back down into the water. By sitting low in the water, it is meant that approximately ¼ to ½ inches of the large end of the cork will sit vertical outside of the water at while the remainder of the cork will sit below the surface of the water. The cork will remain in a vertical position unless it is being jerked by the user via the fishing line it is connected to.

A lead weight 114 is glued inside the first half 108 of the tapered cylindrical body 106 with the help of a second type of adhesive. The lead weight 114 makes the combination of the first half 108 and the hemispherical body 102 heavier than the combination of the second half 110 and the concave lid 104. This ensures that the fishing weight 100 remains upright at all times.

The cork can be secured together by any method knows in the art. It has been found that cement adhesive works well and the cork maintains the ability to handle weights of about 40-60 plus pounds (of dead weight or as a fish), plus maintaining a crushing weight of about at least 200 pounds. The adhesive used here was: 1.) Testor's brand cement for Plastic Models, No 3512 for the lid, and 2.) Extreme Power Thick, Advanced Performance Instant Brand Adhesive for securing the inside parts of the fishing weight.

In an embodiment, lead pellets 116 were placed inside the fishing weight 100 before attaching the concave lid 104 to the fishing weight 100. The pellets allow for filling the cavity, weight, and balance of the cork. The pellets 116 collide with one another, thereby producing a sound that attracts the attention of the fish. In an embodiment, #7.5 birdshot, lead and spherical in shape were used. The shots used herein can be almost anything that will make noise to attract the fish. It is preferable that the shots range from about #6 to #9 in size. Attached is a standard shot chart (Chart 1) for comparing sizes of lead shots. While spherical shaped beads were used here, other shapes are suitable provided they make noise to attract the fish. Generally, with the dimensions as noted herein, and use of lead shots, the overall mass of the cork remains less than about 1 ounce. The cork can weigh up to several ounces and remain useful for fishing. The weight of the cork will depend on the type of bead (size, material, mass) as well as the internal weights 114 employed.

As an alternative to lead shots, non-lead (e.g., plastic) shots were found to still be useful. The size of the shots range from the #7.5 of the lead to about ½ inch for glass marble. While lead shots are preferred, non-lead or non-metal shots, where found suitable for use inside the popping cork. Alternate pellets include those made from stainless steel and other metals such as brass, copper, and regular steel, as well as glass or ceramic. For stainless steel pellets, it was found that a ⅜" shot worked well for making the desired sound and weight. When using stainless steel shots with the current size dimensions, only two ⅜" shots were used within the popper and found to be effective. Hence, when using non-lead metal shots, the range or number of shots per popper can be from about 2-10 depending on the size. Another embodiment of the popper includes having from about 1-10 glass marbles based on size, or plastic beads such as air soft shots, used in the range of about 1-10 per popper. It is preferable to have the shots encompass about ¼ to ½ inch of space within the hollow cavity for optimum noise and weight balance.

In an embodiment the cork contained approximately 65 pellets, of #7.5 lead shot, placed within the hollow cavity of the popper. The number of pellets can vary from about 50-80 per popper with approximately 65 found to produce the sound which attracts fish best. The number of pellets to be used will depend on the size, mass, and weight of the individual bead. But generally it is preferred that the bead encompass about ½ to ¼ inch of space within the cavity of the cork. While plastic and non-metal beads can be used, it is preferable that a bead be used that together with weight 114, has a density greater than water so as to allow for the proper balance of the cork for sitting upright or vertical while in the water.

In making the popper, a hole is drilled into the concave lid 104 to attach a first eye 118. Similarly, a hole is drilled into the hemispherical body 102 to attach a second eye 120. The first eye 118 and the second eye 120 have threading on their body that helps to screw them into their respective positions. The first eye 118 and the second eye 120 used are of size 1/16"×⅝" and ⅛"×⅝", respectively. The first eye 118 and the second eye 120 are firmly secured by gluing them at both ends of the fishing weight 100 with the help of the second type or Extreme Power Thick brand adhesive. The first eye 118 is used for attaching a fishing line which further extends to a fishing rod. The second eye 120 is used for attaching a leader line which further extends to a hook. This design ensures that the fishing rod and the hook are securely attached to the fishing weight 100 at all times. In various embodiments of the present invention, the first eye 118 and the second eye 120 are made of stainless steel or zinc. They can also be made from nickel coated parts or plated materials. The eyes used in the popper are about 1/16×⅝ inch in dimension.

As an alternative to securing the eyes to the popper, plastic (integral with the top or bottom pieces of the pooping cork) eyes can be used in the subject invention. The top and bottom pieces of the popping cork can be injected molded with an eye on each piece for securing the final cork onto the fishing nylon string.

While the method of making the popper includes manual assembly with glue or adhesive and the shots are free floating, an alternate method includes injection molding or 3D printing the cork components.

Approximate dimensions of the popping cork comprise: concave lid 1⅜" across by 1/16" thickness; concaveness is about ⅛", overall length of popper: 2¾" width at the bottom (tapered end where is secured to body) ⅞". Alternatively, the length can vary, for example, by adding approximately 1.5 inches and keeping the width the same approximate size. It has been found that this added length whereby the tapered section is extended, allows for the popper to sit on the water well, allowing for better visibility.

Popping frequency for the cork is advised to be about every 5 to 10 seconds during use so as to allow the popping noise to attract fish and allow the bait to fall into the water to eaten by the fish. It is possible that too much popping will scare the fish. It is desired to obtain a clean pop. When popped properly, usually by a flicking the fishing pole using the wrist, the cork should create a chugging sound, and a splash of water 6 to 8 inches high.

The present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention, and as defined by the following claim.

Chart 1

Lead Shot Comparison Chart

Below is a chart with diameters per pellet and weight for idealized lead spheres.

| Size | Weight | Diameter |
| --- | --- | --- |
| #TriBall 12 | 20.41 g (315 gr.) | 15.24 mm (0.60") |
| #0000 | 5.51 g (85 gr.) | 9.40 mm (0.380") |
| #000 | 4.54 g (70 gr.) | 9.14 mm (0.360") |
| #00 | 3.49 g (53.8 gr.) | 8.38 mm (0.330") |
| #0 | 3.18 g (49 gr.) | 8.13 mm (0.320") |
| #1 | 2.62 g (40.5 gr.) | 7.62 mm (0.300") |
| #2 | 1.91 g (29.4 gr.) | 6.86 mm (0.270") |
| #3 | 1.52 g (23.4 gr.) | 6.35 mm (0.250") |
| #4 | 1.34 g (20.7 gr.) | 6.09 mm (0.240") |
| #FF | 1.18 g (18.2 gr.) | 5.84 mm (0.230") |
| #F (#ITT) | 1.04 g (16.0 gr.) | 5.59 mm (0.220") |
| #TT | 0.899 g (13.9 gr.) | 5.33 mm (0.210") |
| #T | 0.778 g (12.0 gr.) | 5.08 mm (0.200") |
| #BBB | 0.66 g (10.2 gr.) | 4.82 mm (0.190") |
| #BB | 0.57 g (8.8 gr.) | 4.57 mm (0.180") |
| #B | 0.48 g (7.4 gr.) | 4.32 mm (0.170") |
| #2 | (4.4 gr.) | 3.76 mm (0.148") |
| #4 | (3.1 gr.) | 3.28 mm (0.129") |
| #5 | (2.6 gr.) | 3.05 mm (0.120") |
| #6 | (2.0 gr.) | 2.77 mm (0.109") |
| #7½ | (1.5 gr.) | 2.39 mm (0.094") |
| #8 | (1.3 gr.) | 2.26 mm (0.089") |
| #8½ | (0.97 gr.) | 2.16 mm (0.085") |
| #9 | (0.75 gr.) | 2.01 mm (0.079") |
| #12 | | 1.3 mm (0.05") |

What is claimed is:

1. A hollow plastic fishing weight popping cork comprising:
 a tapered cylindrical body forming a first half and a second half separated by an imaginary horizontal plane;
 a hemispherical body fixedly attached to the first half of the tapered cylindrical body; and
 a concave lid fixedly attached to the second half of the tapered cylindrical body, further comprising:
 a first eye fixedly attached to the concave lid and a second eye fixedly attached to the hemispherical body.

2. The hollow plastic fishing weight popping cork according to claim 1, wherein the first eye and the second eye are composed of at least one of plastic, stainless steel and zinc.

3. The hollow plastic fishing weight popping cork according to claim 2 wherein the first eye and the second eye are composed of plastic.

4. The hollow plastic fishing weight popping cork according to claim 1, further comprising a lead weight that is fixedly attached inside the first half of the tapered cylindrical body.

5. The hollow plastic fishing weight popping cork according to claim 1, wherein the first half of the tapered cylindrical body and the hemispherical body are heavier than the second half of the tapered cylindrical body and the concave lid.

6. The hollow plastic fishing weight according to claim 1, wherein the hollow plastic fishing weight houses a plurality of lead pellets.

7. The hollow plastic fishing weight popping cork according to claim 6, wherein each lead pellet is a #7.5 birdshot.

* * * * *